(12) United States Patent
Hinton et al.

(10) Patent No.: US 6,588,539 B2
(45) Date of Patent: Jul. 8, 2003

(54) WHEEL AND FINAL DRIVE ASSEMBLY FOR A GROUND DRIVEN WORK MACHINE

(75) Inventors: David R. Hinton, Mt. Zion, IL (US); Keith A. Kabrick, Springfield, IL (US)

(73) Assignee: Caterpillar Inc, Peoria, IL (US)

(*) Notice: Subject to any disclaimer, the term of this patent is extended or adjusted under 35 U.S.C. 154(b) by 0 days.

(21) Appl. No.: 09/904,301

(22) Filed: Jul. 12, 2001

(65) Prior Publication Data

US 2003/0010549 A1 Jan. 16, 2003

(51) Int. Cl.⁷ .............................................. B60K 17/04
(52) U.S. Cl. ........................................ 180/372; 180/385
(58) Field of Search ................................. 180/371, 372, 180/374, 383, 385, 65.5; 475/331

(56) References Cited

U.S. PATENT DOCUMENTS

| | | | |
|---|---|---|---|
| 3,387,502 A | * | 6/1968 | Le Tourneau |
| 3,770,074 A | * | 11/1973 | Sherman .................. 180/65.6 |
| 4,142,615 A | * | 3/1979 | Sidles, Jr. et al. .......... 192/4 A |
| 4,159,657 A | * | 7/1979 | Stilley ........................ 475/331 |
| 4,186,626 A | * | 2/1980 | Chamberlain ............... 475/337 |
| 4,437,530 A | * | 3/1984 | Young et al. ................ 180/372 |
| 4,873,894 A | * | 10/1989 | Avery et al. ................ 475/334 |
| 5,769,751 A | * | 6/1998 | Forster ....................... 475/346 |
| 6,135,259 A | * | 10/2000 | Forster ................... 475/331 X |
| 6,148,941 A | | 11/2000 | Hinton et al. |
| 6,328,123 B1 | * | 12/2001 | Niemann et al. .......... 180/65.5 |
| 6,458,057 B2 | * | 10/2002 | Massaccesi et al. .... 180/372 X |

OTHER PUBLICATIONS

GE Electric Final Drive Advertisement, GDY85 AC Motorized Wheel for Off–Highway Vehicles:, GEJ–6787.
GE Electric Final Drive Advertisement, "GE Motorized Wheel for Off–Highway Vehicles", GEZ 7222A.
GE Electric Final Drive Advertisement, "GEB23 AC Motorized Wheel for Off–Highway Vehicles".
GE Electric Final Drive Advertisement, Typical 787/788 Motorized Wheel for Off–Highway Vehicles, GEZ 7306B.

* cited by examiner

Primary Examiner—Brian L. Johnson
Assistant Examiner—Bryan Fischmann
(74) Attorney, Agent, or Firm—Larry G Cain; Thomas L Derry

(57) ABSTRACT

A wheel and final drive assembly for a work machine, such as a mining truck, having a driven rotatable wheel having inboard and outboard rims mounted thereto. The final drive assembly including a first and a second reduction gear assembly. A carrier output adapter having an inboard end, an outboard end, a cover attached to the outboard end and a mounting surface. The carrier adapter being attached at the inboard mounting surface to a outboard rim mounting ring and at the cover to a carrier assembly of the second reduction gear assembly.

10 Claims, 4 Drawing Sheets

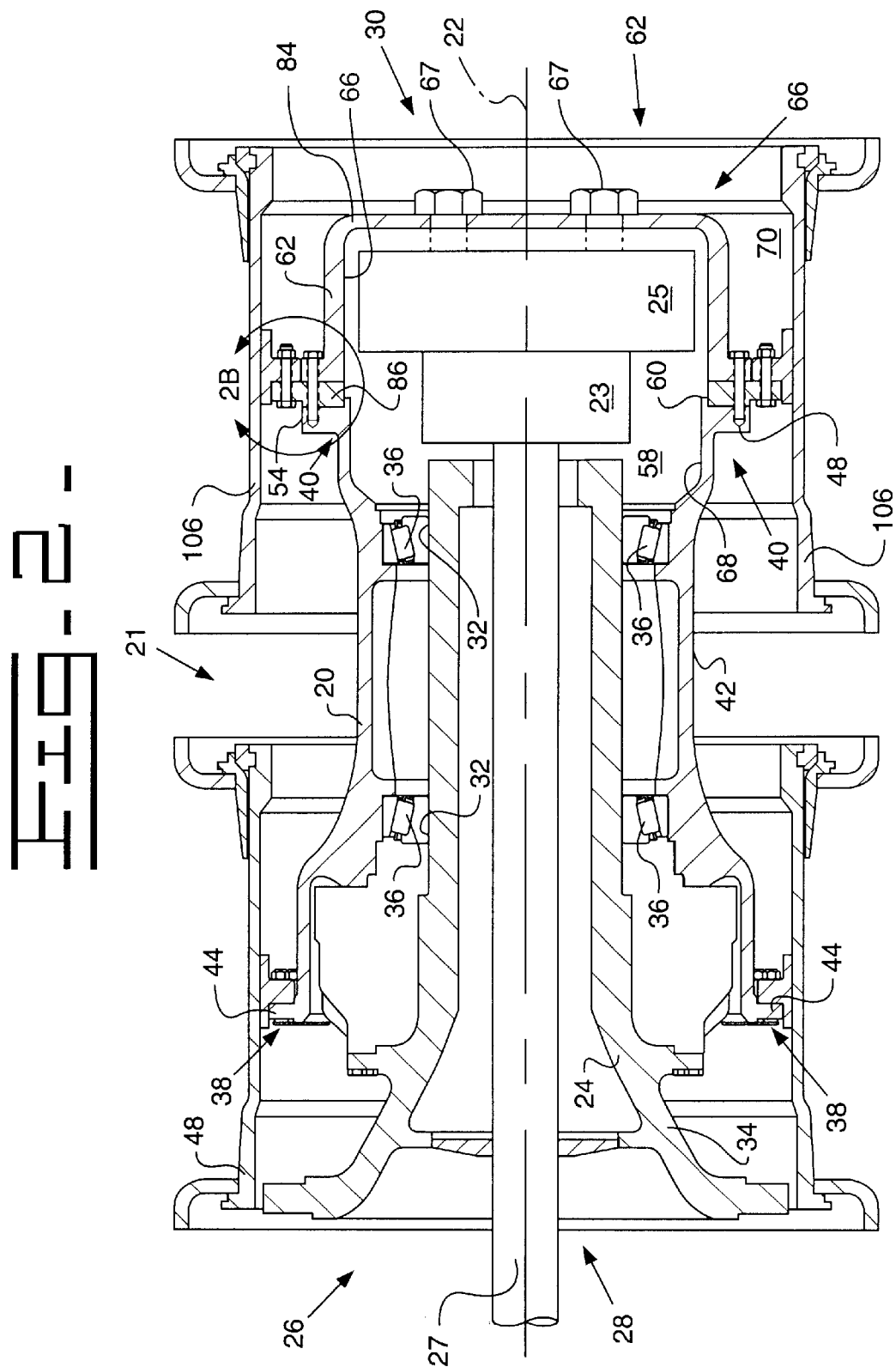

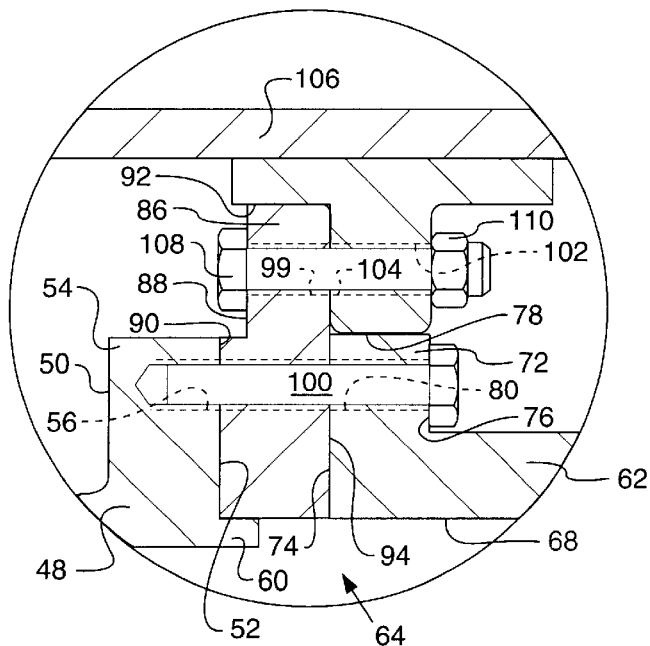
Fig_2a_
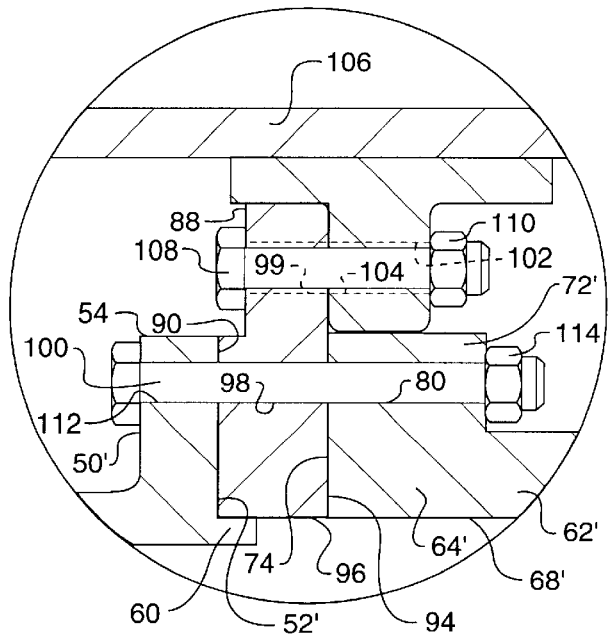
Fig_2b_

WHEEL AND FINAL DRIVE ASSEMBLY FOR A GROUND DRIVEN WORK MACHINE

TECHNICAL FIELD

This invention relates to a wheel and final drive assembly having a carrier output adapter, for use with a ground-driven work machine, such as an off-highway truck.

BACKGROUND

Large earth working machines, such as large mining trucks, typically have at least one pair of driven wheels that are rotatably mounted on corresponding axles or spindles. Each wheel may be driven through a final drive gear assembly, which is typically a double reduction planetary gear arrangement. Typical planetary gear arrangements include a sun gear coupled to and input shaft, a set of planetary gears disposed about the sun gear and held by a carrier and a ring gear disposed about the planetary set. The double reduction gear arrangements typically have an input shaft to a first reduction sun gear and an output through a second reduction carrier or ring gear. Power transfer from the first reduction planetary assembly to the second reduction gear assembly is typically through the first carrier to the second sun gear. A final drive adapter is used to transmit the final output to the rotatably mounted wheel. The final drive adapter couples the second reduction gear assembly to the wheel via a second carrier output adapter or a ring gear adapter.

As the size and capacity of machines increases, greater amounts of gear reduction are required to move the machines across the ground. Because the final drive must be confined within the wheel and rim, the structural design and geometric configuration of the final drive adapter can impact the amount of gear reduction. Another problem incurred when designing final drive assemblies with greater gear reduction is the ability to perform routine maintenance on the final drive assembly. It is preferable, although not always possible, to provide a wheel and final drive assembly that permits maintenance and service of the gear reduction portion of the final drive assembly without having to remove the outboard tire and rim.

In U.S. Pat. No. 4,799,564, a wheel assembly for a large mining truck is described. The output of the second reduction gear assembly is accomplished through a ring gear provided on the inboard portion of the wheel. The first reduction gear assembly is disposed outboard of the second gear assembly.

SUMMARY OF THE INVENTION

In one aspect of the present invention is a wheel and final drive assembly for a work machine. The wheel has an inboard rim mounting flange, and outboard flange and an intermediate portion. An outboard rim mounting ring includes an inboard surface and an outboard surface, the outboard rim mounting ring is removably attached to the outboard mounting flange of the wheel. The final drive assembly includes a double planetary gear arrangement. A carrier output adapter having an inboard end and an outboard end connects the double planetary gear arrangement to the outboard rim mounting ring and wheel.

In another aspect of the present invention a work machine having a wheel and final drive assembly is provided. The wheel includes and inboard rim mounting flange, an outboard mounting flange and an intermediate portion. An outboard rim mounting ring includes an inboard surface and an outboard surface and is removably attached to the outboard mounting flange of the wheel. The final drive assembly includes a double planetary gear arrangement. A carrier adapter having an inboard end and an outboard end connects the double planetary gear arrangement to the outboard rim mounting ring and the wheel.

BRIEF DESCRIPTION OF THE DRAWINGS

FIG. 2 is a cross-sectional view showing a wheel drive assembly in accordance with the present invention.

FIG. 2a is an enlarged view of FIG. 2 taken along line 2B illustrating one embodiment of the present invention.

FIG. 2b is an enlarged view of FIG. 2 taken along line 2B of another embodiment of the present invention.

DETAILED DESCRIPTION

Figure 1:
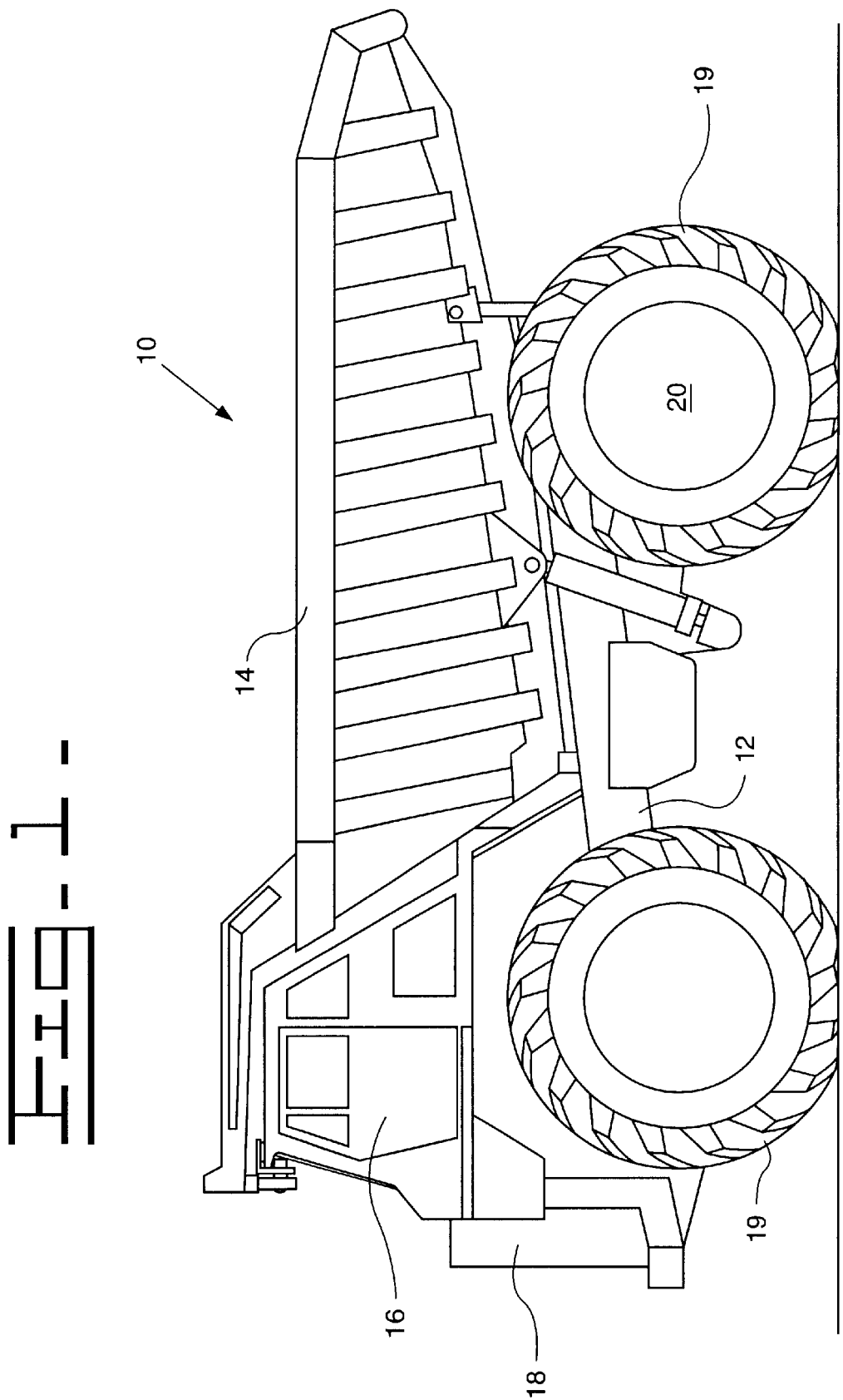
FIG. 1 is a side elevational view of mining dump truck with which this invention may be used.

FIG. 1 illustrates an off-highway truck, generally designated as 10, on which this invention may be used. The illustrated truck 10 may be of any suitable construction. The truck comprises a frame 12, a material carrying dump body 14 pivotally mounted to the frame 12. An operator cab 16 is mounted on the front of the frame 12 above an engine enclosure 18. The truck 10 is supported on the ground by a plurality of tire and rim assemblies 19 (two shown). At the rear of the truck 10, a pair of tire and rim assemblies 19 (two shown in FIG. 2) is mounted on one of a pair of wheels 20 (one shown). As well known in the art, one or more engines (not shown) are housed within the engine enclosure 18. The engine is used to provide power to the wheel 20 and final drive assembly 21, via a mechanical or electric drive train.

Referring now to FIG. 2, a wheel 20 and final drive assembly 21 is defined about a horizontal central axis 22. The final drive assembly 21 includes a first reduction gear assembly 23 and second reduction gear assembly 25. A substantially cylindrical spindle 24 is defined about the central axis 22. The spindle 24 is adapted on a first end (inboard end) 26 to attach to a differential housing (not shown), or alternatively, an electric drive motor housing. The spindle 24 further defines a hole 28 about the central axis 22, the hole 28 extends from the inboard end 26 to a second end (outboard end) 30. An input shaft or drive shaft 27 typically extends through the hole 28 to transmit power to the first and second planetary gear assembly 23 and 25. A pair of bearing mounting surfaces 32 are defined about an outer surface 34 of the spindle 24.

In one embodiment of the invention, a wheel 20 is rotatably mounted on the spindle 24 via a pair of wheel bearings 36. The wheel 20 defines an inboard end 38, an outboard end 40 and an outer surface 42. The inboard end 38 of the wheel 20 includes a radially outwardly extending inboard rim mounting flange 44 defined about the central axis 22. An inboard rim assembly 48 is attached to the inboard rim mounting flange 44 in a conventional manner. The outboard end 40 of the wheel 20 includes an outboard mounting flange 48, also disposed about the central axis 22. The outboard mounting flange 48 may define a radially outwardly extending member having an inboard surface 50, an outboard surface 52 and an outside edge 54 that adjoins the inboard and outboard surfaces 50, 52. Alternatively, the outboard mounting flange 48 may provide a single machined surface disposed about the outboard end 40 of the wheel 20. An alignment ring 60 is further defined about the outboard end 30 of the wheel 20. The alignment ring 60 extends axially outward from the outboard surface 52 of the mounting flange 48 and is preferably integral of the rotatable wheel 20. A plurality of threaded holes 56 disposed in a circular pattern on the inboard surface 50 and are centered about the central axis 22. The plurality of threaded holes 56 extend toward the inboard surface 52 of the outboard mounting flange 48. An outboard annular portion 58 is defined about the central axis 22 near the outboard end 30 of the wheel 20. The outboard annular portion 58 defines an inner surface 60. The first reduction gear assembly 23 and a second reduction gear assembly 25 is adapted to fit within the outboard annular portion 58.

A carrier output adapter 62 defines a substantially cylindrical member disposed about the central axis 22. The carrier output adapter 62 has an inboard end 64, an outboard end 66, an inner surface 68 and an outer surface 70. The inboard end 64 of the carrier output adapter 62 includes a radially outwardly extending mounting flange 72 disposed thereabout. The mounting flange 72 includes an inboard surface 74, an outboard surface 76 and an outside edge 78 extending from the inboard surface 74 to the outboard surface 76. A first plurality of through holes 80 are disposed in a circular pattern about the central axis 22 the and extend from the inboard surface 74 of the mounting flange 70 toward the outboard surface 76 of the carrier output adapter 62. The carrier output adapter 62 defines a closed end portion or cover 84 at the outboard end 66. The cover 84 connects to the carrier of the second reduction gear assembly 25 in a conventional manner, typically through bolts 67.

An outboard rim mounting ring 86 is defined about the central axis 22. The outboard rim mounting ring 86 includes a first inboard surface 88, a second inboard surface 90 and an exterior surface 92, adjoining the first inboard surface 88 and an outboard surface 94. An interior edge 96 is defined between the second inboard surface 90 and the outboard surface 94. A first plurality of through holes 98 are defined in a circular pattern about the central axis 22 on the outboard rim mounting ring 86. The first plurality of holes 98 correspond to the holes 56,80 in the wheel 20 and carrier output adapter 62 and extend from the outboard surface 94 to the second inboard surface 90. A second plurality of through holes 99 extent from the outboard surface 94 of the rim mounting ring 86 to the first inboard surface 88. The second plurality of holes 99 are positioned at a location radially outward from the first plurality of holes 98. The second plurality of holes 99 correspond to a plurality of holes 104 on the outboard rim 106. A bolt 100 is inserted into each of the first plurality of holes 80 of the carrier output adapter 62 and a corresponding one of the of the first plurality of holes 98 of the rim mounting ring and thread into a corresponding one of the threaded holes 56 of the wheel 20. A rim stud 108 is inserted from the first inboard surface 88 of the rim mounting ring 86 into each of the plurality of through holes 98. Each rim stud 108 is further aligned with, and inserted into, one of the holes 102 of the outboard rim 106. A nut 110 engages each rim stud 108 to attach the rim 106 to the rim mounting ring 86.

FIG. 2b illustrates an alternate embodiment of the present invention. A plurality of through holes 112 are defined about the outboard mounting flange 48. The through holes 112 extend from the outboard surface 52' to the inboard surface 50' and are disposed in a circular pattern at a predetermined distance from the central axis 22 and correspond to the first plurality of holes 98 of the output rim mounting ring 86. A bolt 100 is inserted from the inboard surface 50' through the corresponding holes 98, 112 of the outboard rim mounting ring 86 and carrier output adapter 62'. A nut 114 is threaded onto each bolt to secure the carrier output adapter, outboard rim mounting ring 86 and the wheel 20 together.

Figure 2C:
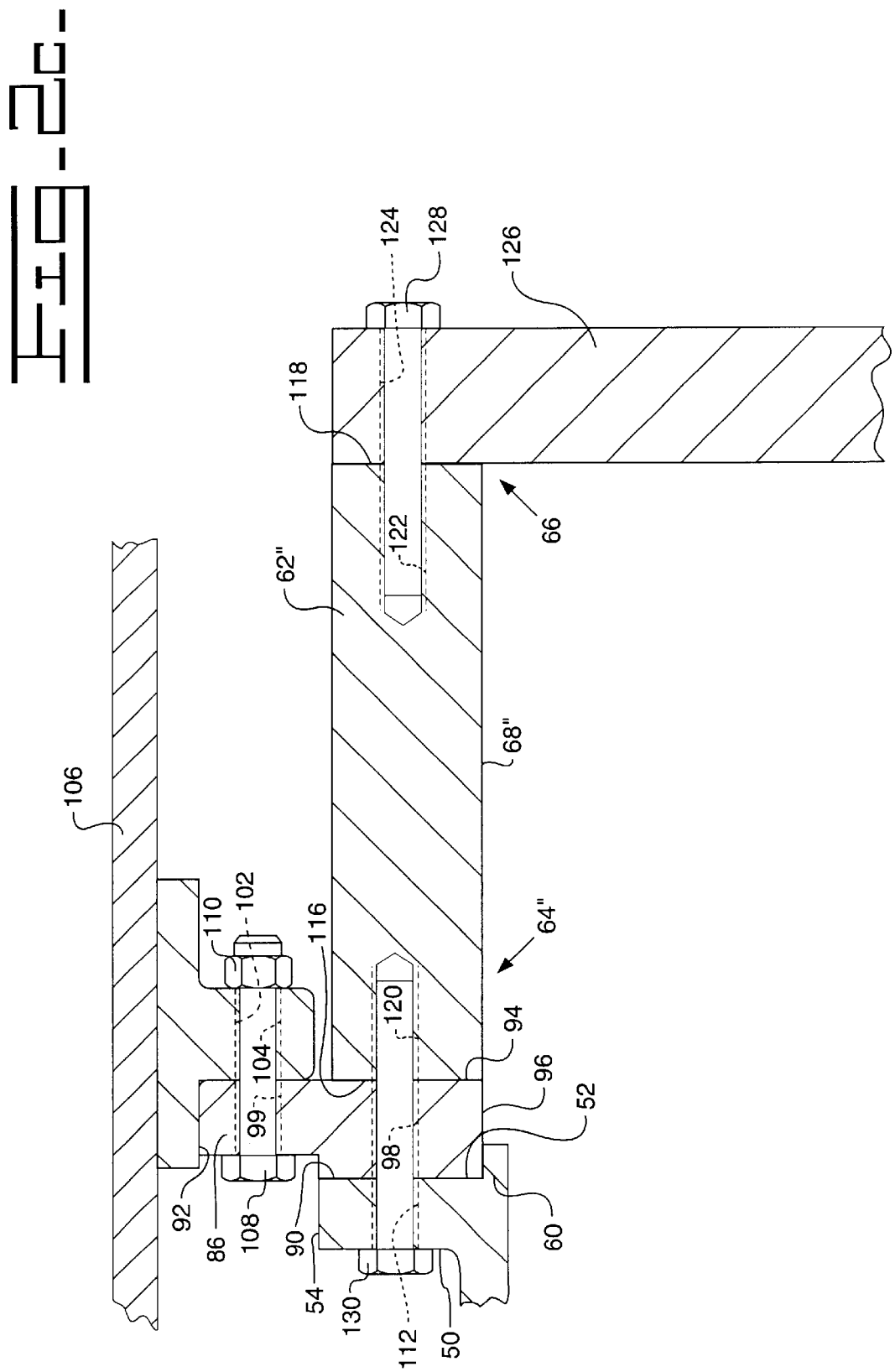
FIG. 2c is an enlarged section view of the carrier output adapter of yet another embodiment of the present invention.

FIG. 2c illustrates yet another embodiment of the present invention. The carrier output adapter 62" defines a substantially cylindrical member. The inboard end 64" of the carrier output adapter 62" defines an inboard mounting surface 116 and an outboard mounting surface 118. A first plurality of threaded holes 120 are defined in the inboard mounting surface 116 of the carrier output adapter 62" and extend toward the outboard end 66". An outboard plurality of threaded holes 122 are defined in the outboard mounting surface 118 and extend toward the inboard end 64". The outboard plurality of holes 122 correspond to a plurality of through holes 124 in an end plate or cover 126. The end plate 126 is attached to the carrier output adapter 62" via high strength bolts 128. The end plate 126 is additionally bolted to the carrier of the second reduction gear assembly 25 in a conventional manner. The first plurality of through holes 112 of the outboard mounting flange 48 of the wheel 20 and corresponding plurality of holes 98 in outboard rim mounting ring 86 align with the corresponding inboard plurality of threaded holes 120 defined in the inboard mounting surface 116. Bolts 130 attach the carrier output adapter 62" to the outboard rim mounting ring 86 and outboard mounting flange 48" of the wheel 20.

Industrial Applicability

The wheel 20 and final drive assembly 21 described above provides several advantages over constructions previously known in the art. More particularly, because the carrier output adapter 62 provides an inner surface 68 that is substantially equal, or larger, in diameter to the annular portion of the wheel 20, the size of the second reduction gear assembly 25 may be maximized, therefore maximizing the amount of gear reduction of the final drive assembly 21.

Service or maintenance of the final drive assembly 21 may be accomplished by removing the outboard tire and rim assembly 19 and removing the bolts 100 that secure the outboard rim mounting ring 86 and carrier output adapter 62 to the wheel 20. In the case of the embodiment illustrated in FIG. 2c, the end plate 128 may be removed without removing the tire and rim assembly 19, providing access to the reduction gear assemblies 23,25.

Although the presently preferred embodiments of this invention have been described, it will be understood that within the purview of the invention various changes may be made within the scope of the claims.

What is claimed is:

1. A wheel and final drive assembly for a work machine, comprising:

said wheel having an inboard rim mounting flange, an outboard mounting surface and an intermediate portion;

a removable rim mounting ring having a first inboard surface and an outboard surface, said inboard surface being attached to said outboard mounting surface of said wheel;

said final drive assembly having a first planetary gear reduction assembly and a second planetary gear reduction assembly coupled to said first planetary gear reduction assembly, said second planetary gear reduction assembly being positioned outboard of said first planetary gear reduction assembly; and a carrier output adapter having an inboard end, an outboard end and a mounting surface disposed about said inboard end, said outboard end of said carrier output adapter being drivingly connected to a carrier assembly of said second planetary gear reduction assembly and said mounting surface being removably attached to said outboard mounting surface.

2. The final drive assembly of claim 1 wherein said outboard end of said carrier output adapter further includes an end plate removably coupled to said carrier output adapter and said second planetary gear reduction assembly.

3. The final drive assembly of claim 1 wherein said mounting surface of said carrier output adapter extends radially outward.

4. The final drive assembly of claim 3 further including a plurality of through holes disposed about said radially outwardly extending mounting surface of said carrier output adapter.

5. The final drive assembly of claim 1, said inboard end of said carrier output adapter further including a plurality of threaded holes extending from said inboard end toward said outboard end.

6. A work machine having a wheel and final drive assembly comprising:

said wheel having an inboard rim mounting flange, an outboard mounting flange and an intermediate portion;

an outboard rim mounting ring having a first inboard surface and an outboard surface, said inboard surface being removably attached to said outboard mounting flange of said wheel;

said final drive assembly having a first planetary gear reduction assembly and a second planetary gear reduction assembly coupled to the first planetary gear reduction assembly, said second planetary gear reduction assembly being positioned outboard of said first gear reduction assembly; and a carrier output adapter having an inboard end, an outboard end and a mounting surface disposed about said inboard end, said outboard end of said carrier output assembly being drivingly connected to a carrier assembly of said second planetary reduction assembly, said mounting surface being removably attached to said outboard rim mounting ring.

7. The work machine of claim 6 wherein said outboard end of said carrier output adapter includes an cover removably coupled to said carrier output adapter and said second planetary gear reduction assembly.

8. The work machine of claim 6 wherein said mounting surface is a radially outwardly extending mounting flange.

9. The work machine of claim 8 further including a plurality of through holes disposed about said radially outwardly extending mounting flange of said carrier output adapter.

10. The work machine of claim 6, said inboard end of said carrier output adapter further including a plurality of threaded holes extending from said inboard end toward said outboard end.

* * * * *